United States Patent [19]

Chen et al.

[11] Patent Number: 5,174,866

[45] Date of Patent: * Dec. 29, 1992

[54] OXYGEN RECOVERY FROM TURBINE EXHAUST USING SOLID ELECTROLYTE MEMBRANE

[75] Inventors: Michael S. Chen, Zionsville; William P. Hegarty, State College; William A. Steyert, deceased, Center Valley, all of Pa.; executrix Lila O. Steyert, Colorado Springs, Colo.

[73] Assignee: Air Products and Chemicals, Inc., Allentown, Pa.

[*] Notice: The portion of the term of this patent subsequent to Jun. 2, 2009 has been disclaimed.

[21] Appl. No.: 834,733

[22] Filed: Feb. 12, 1992

Related U.S. Application Data

[63] Continuation-in-part of Ser. No. 529,093, May 24, 1990.

[51] Int. Cl.⁵ .............................................. G01N 20/26
[52] U.S. Cl. ................................. 204/59 R; 204/424; 204/295; 204/182.3; 55/2
[58] Field of Search ............... 204/424, 295, 182.3, 204/59 R; 55/2, 16

[56] References Cited

U.S. PATENT DOCUMENTS

| | | |
|---|---|---|
| 2,540,151 | 2/1951 | Weller et al. ........................ 183/115 |
| 3,400,054 | 9/1968 | Ruka et al. ............................ 204/1 |
| 3,713,271 | 1/1973 | Franz et al. ........................... 55/16 |
| 3,930,814 | 1/1976 | Gessner ................................. 55/16 |
| 4,131,514 | 12/1978 | Chong et al. ....................... 204/129 |
| 4,132,766 | 1/1979 | Erickson ............................. 423/579 |
| 4,174,955 | 11/1979 | Blackmer et al. .................... 55/158 |
| 4,198,213 | 4/1980 | Mannatt ................................ 55/16 |
| 4,224,045 | 9/1980 | Olszewski et al. .................... 62/30 |
| 4,330,633 | 5/1982 | Yoshisato et al. .................. 501/152 |
| 4,340,578 | 7/1982 | Erickson ............................. 423/579 |
| 4,382,366 | 5/1983 | Gaumer ................................. 62/31 |
| 4,545,787 | 10/1985 | Hegarty ................................ 55/16 |
| 4,547,277 | 10/1985 | Lawless ............................... 204/252 |
| 4,560,394 | 12/1985 | McDonald et al. .................... 55/16 |
| 4,659,448 | 4/1987 | Gordon ............................... 204/277 |
| 4,713,152 | 12/1987 | Walsh ................................. 204/130 |
| 4,725,346 | 2/1988 | Joshi .................................. 204/242 |
| 5,118,395 | 6/1992 | Chen et al. ......................... 204/59 R |

FOREIGN PATENT DOCUMENTS

| | | |
|---|---|---|
| WO8702593 | 5/1987 | European Pat. Off. . |
| 56-92103 | 7/1981 | Japan . |
| 56-41939 | 10/1981 | Japan ................................. 204/424 |

OTHER PUBLICATIONS

Beaver, et al., "Inert Gas Generation Systems for Offshore Platforms"; *Energy Progress;* vol. 6; No. 3; p. 149; (1986).

Yuan and Kroger; Stabilized Zirconia as an Oxygen Pump; *J. Electrochem. Soc.;* pp. 594–600; May 1969.

Takahashi and Iwahara; Oxide Ion Conductors Based on Bismuth Sesquioxide; *Mat. Res. Bull.;* vol. 13; pp. 1447–1453; 1978.

Gür and Huggins; Decomposition of Nitric Oxide Using Solid State Electrolyte; *Fast Ion Transporting Solids;* pp. 109–112 (1979).

*Primary Examiner*—John Niebling
*Assistant Examiner*—Bruce F. Bell
*Attorney, Agent, or Firm*—Geoffrey L. Chase; James C. Simmons; William F. Marsh

[57] ABSTRACT

A process is provided for extracting high purity oxygen from a gas generator turbine exhaust stream by passing the turbine exhaust over the feed side of solid electrolyte membrane selective to the permeation of oxygen over other components of the exhaust stream to separate the oxygen from the exhaust stream, and removing the oxygen product stream from the permeate side of the membrane. The reject exhaust stream is then passed through a power generating turbine to recover net power.

18 Claims, 3 Drawing Sheets

OXYGEN RECOVERY FROM TURBINE EXHAUST USING SOLID ELECTROLYTE MEMBRANE

TECHNICAL FIELD

The present invention is a continuation-in-part of application Ser. No. 07/529,093 filed May 24, 1990.

This invention relates to a method for recovering high purity oxygen from the exhaust of a gas generator turbine using a high temperature solid electrolyte membrane.

BACKGROUND OF THE INVENTION

The separation of gas streams, most notably air, into constituent components such as oxygen and nitrogen has been practiced for many years utilizing energy intensive processes for the recovery of various purities and volumes of the gas product. Chemical and/or physical adsorption of individual gas components, fractional cryogenic distillation of various gas components, and differential permeation through membrane media have all been practiced to recover components of gas streams and particularly to recover oxygen and/or nitrogen from air. These processes generally suffer from high utility costs or the lack of continuous or convenient regeneration or operation.

Various processes for separating gas streams, such as air, have been suggested in which at least some power is recovered from an effluent stream to provide a portion of the power requirements of the process itself.

For example, U.S. Pat. No. 4,132,766 describes a chemical air separation process wherein air, at elevated temperature and pressure, is separated into oxygen and nitrogen-rich waste streams by preferential chemical binding of oxygen from the air. The nitrogen-rich stream is then reduced in pressure through an expander before being vented. The expander drives the compressor to recover some power for the process.

To provide additional power for the operation of compression equipment in a gas separation process, U.S. Pat. No. 4,340,578 suggests that in a chemical air separation plant, the waste nitrogen stream, still containing residual oxygen, is combusted with a fuel. The hot effluent is then expanded in several stages through turbines and power is recovered.

Alternately, U.S. Pat. No. 4,560,394 discloses that air may be compressed in a compressor, reduced in temperature by heat exchange against process streams or external cooling means and then separated into oxygen and a nitrogen-rich effluent stream by passage over a semipermeable membrane. While some power is recovered by pressure reduction of the nitrogen-rich stream, no fuel is combusted and no net power is produced.

Power generation can be achieved using a cryogenic air separation process as described in U.S. Pat. No. 4,224,045. In that process, air is compressed and then cooled to its liquefaction temperature before being distilled through a fractionation column. The waste stream from the column is rewarmed, recompressed, and then combusted with fuel and by-pass air. The combusted effluent is expanded through a turbine to recover power for the process.

U.S. Pat. No. 4,545,787 teaches a method for the generation of net power and the recovery of by-product oxygen-rich gas at low power requirements. Air is compressed to an elevated temperature and pressure. At least a portion of the air is combusted and a portion of the oxygen is removed from the air or combustion effluent through a membrane or adsorbent before the oxygen-lean combustion effluent is expanded through a turbine to recover power for the process and net power. While this system is attractive, it is not always possible to include such an oxygen extraction device without substantial modification of the gas turbine construction and degradation in power generation performance. This is particularly true where the retrofitting of an existing simple gas turbine having no external combuster is required.

SUMMARY OF THE INVENTION

The present invention provides a process for recovering high purity oxygen from hot gas turbine exhaust gases at low capital cost and with low energy requirements which comprises passing a gas turbine exhaust stream over the feed side of a solid electrolyte membrane cell system and recovering high purity oxygen from the permeate side of the membrane and resulting in an oxygen-depleted exhaust gas stream.

The process of the invention is an improvement over prior processes which normally generate power through combustion of fuel and compressed air with expansion of the combusted gas in a turbine. The invention comprises passing a hot gas turbine exhaust stream which preferably has a temperature ranging from about 850° to 1800° F. (454° to 985° C.), an exhaust pressure ranging from about 0.2 to 100 psig (0.01 to 7 atm gauge), and an oxygen content ranging from about 5 to 18% by volume over the feed side of a solid electrolyte membrane selective to the permeation of oxygen over other gaseous components, preferably at a membrane temperature ranging from about 1000° to 2000° F. (535° to 1100° C.) and a feed pressure ranging from about 0.2 to 100 psig (0.01 to 7 atm gauge) to separate the oxygen from the exhaust gas stream, and removing the oxygen product stream from the permeate side of the membrane.

In one embodiment, the present invention is a process for oxygen coproduction and net power generation, comprising: combusting a fuel with air to produce a combustion product stream, expanding the combustion product stream through a turbine of a gas generator, recovering oxygen from a resulting about 850° to about 1800° F. temperature and about 0.2 to about 100 psig pressure exhaust stream from said gas generator turbine which stream contains from about 5 to about 18% by volume of oxygen, which recovery comprises passing the exhaust stream over a feed side of a solid electrolyte membrane selective to the permeation of oxygen over other components of the stream to separate oxygen from the exhaust stream and removing the oxygen from the permeate side of the membrane, and then further expanding the exhaust stream through a power generating turbine to recover net power.

DETAILED DESCRIPTION OF THE INVENTION

Figure 1:
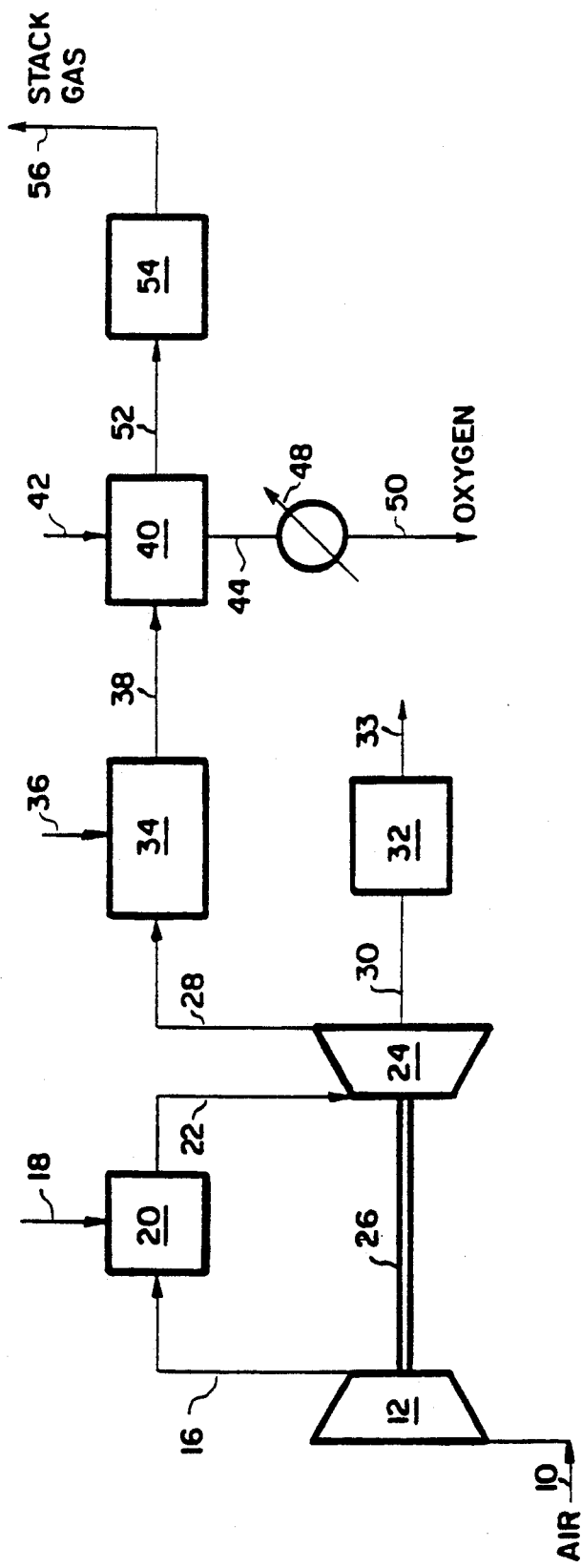
FIG. 1 is a schematic representation of one process embodiment of the present invention.

In any method for the generation of power in a combustion turbine and for the production of an oxygen-enriched by-product in which an air stream is compressed to an elevated pressure and temperature preceding the turbine and combusted, at least in part, with a fuel stream to provide a combustion product stream which is expanded through the turbine to provide air compression power, the improvement of the invention provides a treatment for the exhaust gas stream or effluent which comprises passing the exhaust or effluent over the feed side of a solid electrolyte membrane (SEM) cell selective to the permeation of oxygen over other gaseous components, separating oxygen from the exhaust or effluent with the SEM cell, and recovering high purity oxygen gas from the permeate side of the membrane. The oxygen-depleted stream can then be fed to a heat recovery system to produce steam to generate additional net power. Thus, the present invention provides an improvement over prior processes such as those disclosed in U.S. Pat. No. 4,545,787, for example. Alternatively, after expansion through a gas generator turbine and over an SEM, the reject gas stream is expanded through a power generating turbine to recover net power.

The solid electrolyte membrane (SEM) cell used in the invention is a solid electrolyte thin film or membrane with high oxygen ion conductivity and low electron conductivity. The SEM can be a membrane of any desired configuration such as flat, tubular, honeycomb, and the like, situated between two electrodes positioned to apply external voltage across the membrane or film surface and multiple (two or more) cells can be connected in series or in parallel. These are referred to herein as electrode SEMs. Such SEMs are used where the partial pressure of oxygen on the feed side is lower than that on the permeate side.

Alternatively, the SEM can comprise a solid electrolyte thin film or membrane of any desired configuration as described above but made of mixed conductors with mixed conductivity of oxygen ion and electrons which functions without electrodes and without externally applied voltage. These electrodes are referred to herein as electrodeless SEMs. Such SEMs are used where the partial pressure of oxygen on the permeate side is lower than that on the feed side. The lower permeate side pressure is generally maintained by pulling a vacuum on the permeate side. The electrodeless SEM has the particular advantage of eliminating the complexity, cost and over-potentials loss generally associated with electrodes and connectors used in an electrode SEM cell.

The solid electrolyte membrane cells of the invention are, in one instance, installed in the gas turbine exhaust duct between the gas turbine and the downstream heat recovery steam generation (HRSG) system. When the gas turbine exhaust stream is to be heated prior to being permeated through the membrane, a supplemental burner is used in the gas turbine system. The SEM cells are then located downstream of the burner to take advantage of the extra heating of the turbine exhaust gas to reduce the membrane area requirement because oxygen ion conductivity increases with increasing temperature. This is a preferred but not critical installation for the operation of the invention. Alternatively, if the SEM is located between the gas generator turbine and a power turbine for net power recovery, then the feed to the SEM does not need to be preheated separately.

The membranes of the invention are also capable of decomposing NOx and SOx compounds. Since the typical fired gas turbine produces substantial NOx emissions, this invention is particularly useful for abating NOx in those areas in which it is a serious concern such as, for example, in California.

In one embodiment of the invention, an oxygen ionic potential is maintained on the cell by applying DC power on electrodes through an external circuit in an electrode SEM cell or, in another embodiment, by applying a vacuum on the permeate side of an electrodeless SEM cell. In a further embodiment of the invention, the exhaust gas stream or effluent is fed through a heater to increase its temperature before it is permeated through the selective SEM. A sweep gas, such as an inert gas, can be conducted over the permeate side of the membrane to lower the oxygen partial pressure and enhance the permeation of oxygen through the membrane.

The present invention can be used to provide an economical means to recover by-product oxygen from a gas turbine system, particularly from gas turbine exhaust. Gas turbine exhaust treated in accordance with the invention generally has an exhausted gas temperature of from about 850° to about 1800° F. (454° to 985° C.), an exhausted gas pressure of from about 0.2 to about 100 psig (0.01 to 7 atm gauge), and contains from about 5 to about 18 volume % oxygen. By-product oxygen can be produced from gas turbine exhaust without significantly affecting the upstream gas turbine construction and power generation efficiency or the downstream heat recovery steam generation (HRSG) system because the amount of oxygen extracted and pressure drop through the SEM cell system are both small.

In a preferred system, the solid electrolyte membrane is operated at a temperature of from about 1000° to about 2000° F. (535° to 1100° C.) for a gas turbine exhaust gas feed pressure of from about 0.2 to about 100 psig (0.07 to 7 atm gauge). In one embodiment, the solid electrolyte membrane cell is installed in the exhaust duct of a power generating system between a supplemental burner and a HRSG system as shown in FIG. 1 to take advantage of additional heating by post combustion of the gas turbine exhaust gases with additional fuel injection in the exhaust duct. Heat can be recovered to make steam and oxygen. Recoveries of from about 2 to about 80% at high purity are readily achieved.

In one preferred embodiment, oxygen by-product is produced by utilizing an electrode SEM cell comprising a thin solid electrolyte film sandwiched by two electrodes. Oxygen molecules on the feed side of the unit are electrochemically dissociated into oxygen ions on the cathode. The ions are then transported across the matrix of solid electrolyte film by the applied voltage and recombined to form oxygen molecules on the anode. Electrons are conducted through an external electric circuit and a direct power source.

Multiple (two or more) units can be connected in series or in parallel and a unit or cell can have any desired configuration such as a pancake, tube, honeycomb, disc, or the like.

The SEM units or cells can be constructed of any suitable solid electrolyte materials, or mixtures thereof, which are capable of transporting oxygen ions at high temperatures (e.g. 1000°-2000° F. [535°-1100° C.]). By applying an external power input through electrodes and an electric circuit, the ionic nature of the membrane allows it to transport or "pump" oxygen from a region of low partial pressure to a region of higher pressure. The selectivity of such membranes for oxygen is very high because the ionic transport mechanism would not be operative for other combustion gas components.

Examples of some such solid electrolyte materials which may be used include bismuth oxide, zirconia, and the like doped with various oxides such as yttria, calcia, barium oxides, and the like. Preferably bismuth oxide doped with calcia is used. Most preferably, bismuth sesquioxide-based materials are used because they have very high ionic conductivities.

Any suitable electrode materials having high electronic conductivity as well as high oxygen transport properties can be used such as, for example, silver, platinum, lanthanum-strontium-magnesium oxide (LSM), lanthanum-strontium-cobalt oxide (LSC), and the like. Preferably, LSM oxides are used for their high conductivities and thermal compatibility with the solid electrolyte materials. The electrolyte membrane can have any suitable thickness, preferably in the range of from about 10 to 1000 micrometers, most preferably 20 to 100 microns, and can have any suitable oxygen conductivity such as, for example, conductivities in the range of about 0.01 to 2 ohm$^{-1}$cm$^{-1}$, preferably 0.5 to 1 ohm$^{-1}$ cm$^{-1}$. The electrodes can have any suitable thickness and can be situated on either side of the electrolyte membrane. The electrodes are preferably porous and operated at any suitable current density, preferably ranging from about 0.05 to 2 amperes/cm$^2$, most preferably 0.5 to 1 ampere/cm$^2$.

Solid electrolyte membrane cells can also decompose NOx and SOx simultaneously as noted hereinbefore, making them valuable as emission abatement devices. Suitably doped ZRO2 and Bi2O3 membranes are preferred for this application.

In another preferred embodiment of the invention, by-product oxygen can be produced from the gas turbine exhaust by utilizing an electrodeless SEM cell composed of a thin solid electrolyte film without electrodes. Suitable solid electrolyte materials can be any mixed conductors having high oxygen ionic and electronic conductivities such as Co-Sr-Bi, Co-La-Bi, Co-Sr-Ce, Co-La-Ce oxides, and the like, with oxygen ionic conductivies in the range of about 0.01 to 1 ohm$^{-1}$ cm$^{-1}$ and electronic conductivities in the range of about 1 to 30 ohm$^{-1}$ cm$^{-1}$, most preferably with ionic conductivities in the range of about 0.5 to 1 ohm$^{-1}$ cm$^{-1}$ and electronic conductivities in the range of about 10 to 25 ohm$^{-1}$ cm$^{-1}$. Electrodeless SEM cells are preferably operated by maintaining an oxygen pressure on the feed side such that a positive driving force for oxygen ion transport can be achieved in the absence of an externally applied voltage and power source. The electrons released at the anode would flow back to the cathode side through the mixed conductor film itself without going through electrodes and an external electrical circuit. One particular advantage of such a cell is a significant reduction in over-potential loss associated with electrode SEM cell systems.

Referring now to the figures which illustrate preferred embodiments, it can be seen from FIG. 1 that air 10 is compressed by a compressor 12 to produce compressed air 16 which is fed to combustor 20 with fuel 18.

Combuted gas 22 is then expanded through gas turbine 24 to yield exhaust gas 28. Part of the mechanical energy produced by the gas turbine is transmitted through shaft 26 to drive air compressor 12 and part of the energy is transmitted through shaft 30 to generator 32 to produce net power 33. One such system is described in U.S. Pat. No. 4,545,787, the disclosure of which is hereby incorporated by reference.

For a typical frame 5 GE gas turbine system, net power is about 22,340 KW, and the exhaust gas, having an oxygen content of about 16 mol %, has a gas flow rate of about 31,945 lb-mol per hour (14,490 kg-mol/hr), a temperature of about 939° F. (503° C.), and a pressure of about 14 inches of water gauge (0.034 atm gauge). Generally, gases having oxygen contents in the range of about 10 to 20%, preferably 15 to 18% can be treated at any flow rate at temperatures in the range of about 800° to 2400° F. (427°-1316° C.), preferably 1300° to 2000° F. (704°-1093° C.), and at pressures in the range of from about 1 to 50 inches of water gauge (0.0025-0.1233 atm gauge), preferably 5 to 25 inches of water gauge (0.012-0.061 atm gauge). Gas turbine exhaust containing 16-18% free oxygen at high temperatures is readily available for the coproduction of oxygen without the need for extra air compression.

For steam generation, exhaust gas 28 is directed through an exhaust duct with supplemental burner 34 firing fuel gas 36 using a minor amount of contained oxygen. The temperature of exhaust gas 38 rises to about 1400° F.(760° C.). This gas has a flow of about 32,305 lb-mol/hr (14,654 kg-mol/hr) and contains about 13.6% oxygen.

Figure 2:
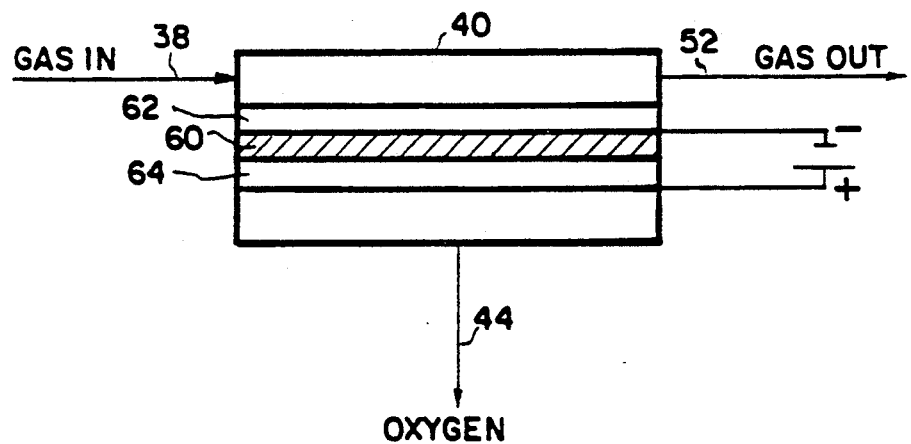
FIG. 2 is a schematic representation of a solid electrolyte membrane cell having electrodes and externally applied voltage for oxygen pumping which can be used in the practice of the invention.

Solid electrolyte membrane cell 40 installed in the exhaust duct, extracts oxygen at the rate of about 260 lb-mol/hr (118 kg-mol/hr) or 5.9% of contained oxygen from stream 38. As more particularly shown in FIG. 2 for one preferred electrode system, cell 40 contains a solid electrolyte membrane of bismuth oxide doped with calcia in the form of a sheet or film 60 having an area of 13,613 ft$^2$ (1265 m$^2$) and a thickness of about 50 microns. The membrane is sandwiched between cathode and anode electrodes, 62 and 64 respectively, and at about 1 ampere/cm$^2$ has an oxygen conductivity of 1 ohm$^{-1}$cm$^{-1}$. Again referring to FIG. 1, the extraction and pumping of oxygen from 0.133 atm to 1.04 atm across the membrane is effected by means of power source 42 with about 1340 KW of input power.

Pure oxygen permeate stream 44 is cooled through a series of heat exchangers 46 by generating steam 48 to yield an oxygen product 50 equivalent of 100 short tons per day (90.8 metric tons/day).

Oxygen-depleted or exit stream 52 is passed on to heat recovery steam generator 54. Exhaust stream 56 goes to the stack at a gas flow rate of 32,045 lb-mol/hour (14,536 kg-mol/hr).

The total power consumption for the 100 ST/D oxygen production in this preferred embodiment, calculated at about 1374 KW, includes 34 KW of a small power penalty due to about a 1 inch water (0.0025 atm) pressure drop of the membrane unit in the duct and about 670 KW power loss due to electrode over-potentials. Thus, power per short ton of oxygen is about 330 KWH. This compares favorably with 250-300 KWH/ton oxygen required for a large, modern, efficient, low pressure, cryogenic oxygen plant. It also provides advantages over the system described, for example, in U.S. Pat. No. 4,545,787 since it extracts oxygen from the gas turbine exhaust at low pressure instead of from the hot gas at high pressure upstream of the turbine. Further, it accomplishes this without much effect on turbine construction and operation. It has the further advantage of easy retrofit with any simple gas turbine system with no external combustors. The invention also enjoys an overall cost advantage for oxygen coproduction with power generation over prior art stand-alone oxygen plants which require dedicated air compressors, heat exchangers, and the like.

Figure 3:
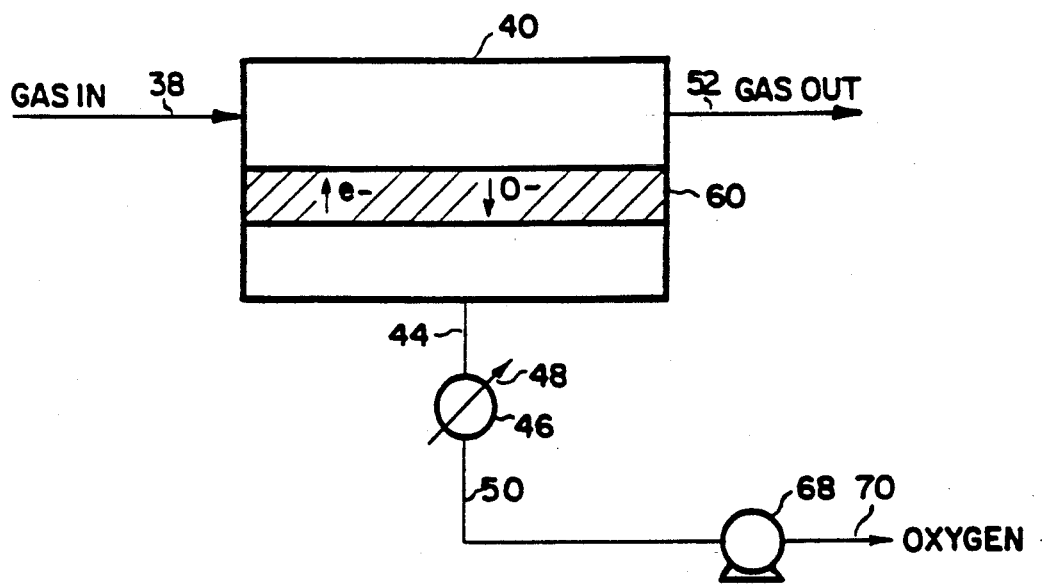
FIG. 3 is a schematic representation of a solid electrodeless electrolyte membrane cell with mixed conductors to effect both oxygen ion and electron transport across the membrane in opposite directions which can be used in the practice of the invention.

In another preferred embodiment of the invention, oxygen is extracted from gas turbine exhaust gas using an electrodeless SEM cell as illustrated in FIG. 3. As shown in FIG. 3, a preferred electrodeless SEM cell 40 containing Co-La-Bi mixed conductors as the electrolyte in the form of a sheet or film 60 having a total area of 13,613 ft$^2$ (1265 m$^2$) and a thickness of 50 microns has an oxygen ionic conductivity of 0.15 ohm$^{-1}$ cm$^{-1}$ and an electronic conductivity of 25 ohm$^{-1}$ cm$^{-1}$ at 1 ampere per cm$^2$. The extraction of oxygen at 260 lb-mol per hour (118 kg-mol/hr) is effected by using vacuum pump 68 to pull a vacuum to about 0.03 atm on the cooled pure oxygen permeate gas 50 such that a positive driving force of oxygen partial pressure is maintained from cathode to anode. Since the electrolyte possesses high electronic conductivity, the electrons released at the anode spontaneously flow back through the membrane from anode to cathode.

The total power consumption for the electrodeless SEM and vacuum pump is estimated to be about 665 KW, including a small power penalty due to pressure drop of gas flowing through the SEM cell and a much smaller power loss of over-potential at electrolyte interfaces due to the absence of electrodes. The specific power for 100 short tons per day of oxygen extraction is calculated to be about 160 KWH per ton of oxygen, which compares favorably with conventional cryogenic air separation plants.

Variations in the configuration of the preferred embodiment discussed above can be made without detracting from the efficiency of the system. For example, oxygen-depleted stream 52 can also be used to preheat compressed air 16 in a recuperator prior to feeding it to combustor 20 instead of feeding it to the heat recovery steam generating system 54.

Figure 4:
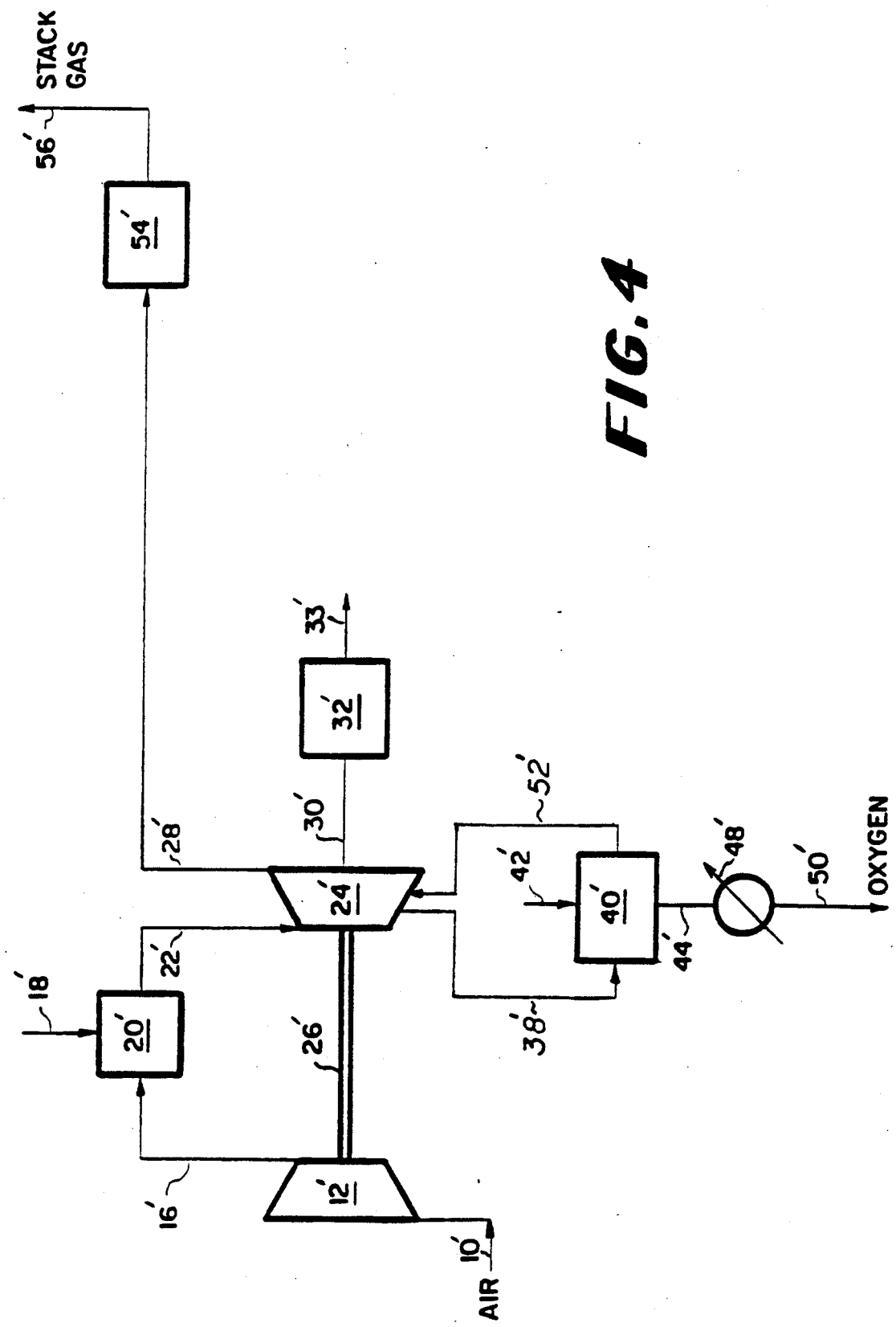
FIG. 4 is a schematic representation of another process embodiment of the present invention.

With reference to FIG. 4, an alternative embodiment to the present invention will be set forth wherein the extraction of oxygen is conducted in the exhaust stream from a gas generating turbine in contrast to a power generating turbine. The gas generator turbine is the turbine of a typical gas generator, such as an aeroderivative generator, that is used to compress air feed to the combustion stage, in contrast to production of net power. The power generating turbine is a turbine or stage in excess of that necessary to compress feed air, which power generating turbine produces net power from the gas generator effluent. Air 10' introduced into a compressor 12' of a gas generator. The gas generator for purposes of this embodiment comprises the compressor 12', the combustor 20', the drive axle 26' and the first stage(s) of the gas generator's turbine 24' necessary to drive the compressor 12'. The air, after being compressed to elevated pressure through compressor 12', is removed in line 16' and combusted with fuel 18' introduced into the combustion chamber 20'. The combusted gas in line 22' is then introduced into the first stage(s) of the turbine of the gas generator 24'. For purposes of this embodiment, the turbine 24' can be a multistaged turbine having a first gas generator powering turbine section to power the compressor 12' through drive axle 26' and a second turbine section which produces power through appropriate connection 30' to a generator 32' to export net power 33'. The art of gas generators and power producing turbine is well known and multistaged turbines for such duty is also well known. Alternatively, turbine 24' could be a multi-shaft mechanical device wherein the initial stage(s) of the turbine 24' is not mechanically linked with the final stage of turbine 24', as would be the case in a two-shafted gas generator.

After the turbine exhaust stream from the first stage of turbine 24' is expanded, it is removed in line 38' and introduced into a solid electrolyte membrane cell 40' which is selectively permeable for oxygen. The oxygen is removed in line 44' and is cooled through heat exchanger 48' to be removed as an oxygen product in line 50'. The reject stream from the membrane 40' in line 52' is still at elevated temperature and pressure and can be further reduced in pressure for the production of net power by passing it through a second stage(s) of turbine 24' to recover shaft power in connection or shaft 30' for generator 32' to produce, for instance, electric power 33'. The fully expanded exhaust stream is then removed in line 28' and passed through a heat recovery steam generator 54' before being exhausted as a stack gas in line 56'.

A typical turbine which can be used in this service is a General Electric LM2500-GE, which is known in the art to have a multi-shaft turbine configuration. Such turbines are well known in the prior art. The use of a solid electrolyte membrane to recover oxygen in the position of this embodiment of the present invention would decrease power turbine flow by the amount of oxygen extracted and the pressure drop associated with the solid electrolyte membrane. This decrease in net power plus the solid electrolyte membrane power or oxygen vacuum pump power is the total power chargeable to recovering oxygen at the site of this embodiment to the present invention. The location of a solid electrolyte membrane for oxygen recovery in this embodiment has advantages over the arrangements in prior U.S. Pat. No. 4,545,787 and the embodiment illustrated in FIG. 1 of the present application. The primary advantage of the embodiment of FIG. 4 over U.S. Pat. No. 4,545,787 is that it avoids expensive and difficult modifications to the critical turbine combustor system. The advantages of the embodiment of FIG. 4 over the embodiment of FIG. 1 is that the gas temperature and oxygen partial pressures at the solid electrolyte membrane in FIG. 4 are increased over that experienced in the embodiment of FIG. 1. The desirable high temperatures of operation at the solid electrolyte membrane in the embodiment of FIG. 4 is attained directly by its critical positioning between the respective stages of turbine expansion without the necessity of providing the fuel stream or the burner system 36 and 34, respectively, for gas reheat of the embodiment of FIG. 1.

The higher pressure of operation of the solid electrolyte membrane in the embodiment of FIG. 4 increases the oxygen partial pressure at the membrane surface. This reduces the electric power requirement for the electrodes illustrated in FIG. 2. For the electrode-less solid electrolyte membrane of FIG. 3, the increased oxygen partial pressure in line 38 raises allowable and practical pressure of the permeated oxygen, stream 44, and decreases the power, size and cost of the vacuum pump 68. The decrease in vacuum pump power more than compensates for the reduction in net turbine power experienced in the embodiment of FIG. 4 of the present invention.

As an example, the total power required to recover 100 tons per day of oxygen from the FIG. 3 arrangement used with the FIG. 1 embodiment and the embodiment of FIG. 4 using a General Electric LM2500-GE gas fueled gas generator can be compared at 100 tons per day of oxygen. The General Electric LM2500-GE gas generator will deliver 18,840 lb-moles per hour (8478 kg-mol/hr) of gas at 48.4 psia (3.3 atm) and 1461° F. (794° C.) containing 14.1 mole% oxygen at 6.8 psia (0.46 atm) partial pressure. Extracting 260 lb-moles per hour (118 kg-mol/hr) of oxygen; that is, 100 tons per day of oxygen, with 1 inch of water solid electrolyte membrane pressure drop will permeate oxygen to a pressure of 3 psia (0.2 atm). The power turbine net power will decrease by 14 KW due to the 1 inch of water pressure loss and by 347 KW because of decreased gas flow. At the same vacuum pump isothermal efficiency (47%) as FIG. 1, the oxygen vacuum pump power will be 287 KW for the embodiment of FIG. 4. The total power chargeable to oxygen recovery is then 648 KW, or 155.5 KWH per ton of oxygen produced in the embodiment of FIG. 4. This compares favorably with the FIG. 1 required power of 160 KWH per ton of oxygen, while eliminating the fuel and burners and decreased power generation efficiency of the FIG. 1 and FIG. 3 combined arrangement.

Thus, in any method for the generation of power in a combustion turbine and for the production of an oxygen-enriched by-product in which an air stream is compressed to an elevated pressure and temperature preceding the turbine and combusted, at least in part, with a fuel stream to provide a combustion product stream which is expanded through the turbine to provide air compression power, the improvement of the invention provides a treatment for feeding the exhaust or effluent through a heater to increase its temperature (or alternatively, extracting oxygen between stages of expansion), passing the heated exhaust or effluent over the feed side of a solid electrolyte membrane selective to the permeation of oxygen over other gaseous components while an oxygen ionic potential is maintained either by applying a DC power on electrodes through an external circuit in an electrode SEM cell or by applying vacuum on the permeate side of an electrodeless SEM cell to extract oxygen from the exhaust or effluent and recovering high purity oxygen gas from the permeate side of the membrane. The oxygen-depleted stream is fed to a heat recovery system to produce steam to generate additional net power.

The present invention provides an attractive method for oxygen coproduction in a gas turbine system with a very reasonable consumption and overall equipment cost. Added benefits include $NO_x$ and other pollutant decomposition in the process.

Although the invention has been described in considerable detail in the foregoing, it is to be understood that such detail is solely for the purpose of illustration and that variations may be made by those skilled in the art without departing from the spirit and scope of the invention except as set forth in the claims.

We claim:

1. A process for oxygen coproduction and net power generation, comprising:
   (a) combusting a fuel with air to produce a combustion product stream,
   (b) expanding the combustion product stream through a turbine of a gas generator,
   (c) recovering oxygen from a resulting about 850° to about 1800° F. temperature and about 0.2 to about 100 psig pressure exhaust stream from said gas generator turbine which stream contains from about 5 to about 18% by volume of oxygen, which recovery comprises passing the exhaust stream over a feed side of a solid electrolyte membrane selective to the permeation of oxygen over other components of the stream to separate oxygen from the exhaust stream and removing the oxygen from the permeate side of the membrane, and
   (d) then further expanding the exhaust stream through a power generating turbine to recover net power.

2. The process of claim 1 wherein the gas turbine exhaust stream passes over a solid electrolyte membrane having a temperature of from about 1000° to about 1800° F.

3. The process of claim 1 wherein from about 2 to about 80% of the oxygen in the gas turbine exhaust stream is recovered.

4. The process of claim 1 wherein the oxygen ionic potential is maintained on the membrane by situating the membrane between two electrodes positioned to apply external voltage across the membrane surface.

5. The process of claim 4 wherein the partial pressure of oxygen on the feed side of the membrane is lower than that on the permeate side of the membrane.

6. The process of claim 4 wherein a current density of 0.05 to 2 amperes/cm2 is applied across a 10 to 1000 micron thick solid electrolyte membrane.

7. The process of claim 4 wherein the exhaust gas stream contacts two or more membranes.

8. The process of claim 7 wherein the membranes are connected in series or parallel.

9. The process of claim 2 wherein the membrane is made of mixed conductors with mixed conductivity for oxygen ions and electrons.

10. The process of claim 9 wherein the partial pressure of oxygen on the permeate side is lower than that on the feed side.

11. The process of claim 2 wherein an oxygen-depleted exhaust stream of step (d) is fed through a heat recovery system.

12. The process of claim 2 wherein the gas turbine exhaust stream contacts a doped zirconia membrane for separation of oxygen.

13. The process of claim 2 wherein the gas turbine exhaust stream passes over a doped bismuth oxide membrane for separation of oxygen.

14. The process of claim 2 wherein the gas turbine exhaust stream passes over a Co—Sr—Bi oxide mixed conductor membrane for separation of oxygen.

15. The process of claim 2 wherein the gas turbine exhaust stream passes over a Co—La—Bi oxide mixed conductor membrane for separation of oxygen.

16. The process of claim 2 wherein the gas turbine exhaust stream passes over a Co—Sr—Ce oxide mixed conductor membrane for separation of oxygen.

17. The process of claim 2 wherein the gas turbine exhaust stream passes over a Co—La—Ce oxide mixed conductor membrane for separation of oxygen.

18. The process of claim 1 which comprises passing a sweep gas over the permeate side of the membrane.

* * * * *